United States Patent

Dunmead et al.

[11] Patent Number: 5,756,410
[45] Date of Patent: May 26, 1998

[54] METHOD FOR MAKING SUBMICROMETER TRANSITION METAL CARBONITRIDES

[75] Inventors: Stephen D. Dunmead, Midland, Mich.; Alan W. Weimer, Niwot, Colo.

[73] Assignee: The Dow Chemical Company, Midland, Mich.

[21] Appl. No.: 807,165

[22] Filed: Feb. 27, 1997

[51] Int. Cl.⁶ .......................... C04B 35/58; C01B 21/00
[52] U.S. Cl. .................. 501/96.1; 423/371; 423/380; 423/382; 501/87; 501/93
[58] Field of Search ....................... 423/371, 380, 423/382; 501/87, 93, 96.1

[56] References Cited

U.S. PATENT DOCUMENTS

| | | | |
|---|---|---|---|
| 1,088,359 | 2/1914 | Peacock | 423/382 |
| 3,492,100 | 1/1970 | Roubin et al. | 23/315 |
| 3,615,271 | 10/1971 | Dietz | 423/371 |
| 3,745,209 | 7/1973 | Middelhoek | 423/371 |
| 3,839,542 | 10/1974 | Chase | 423/346 |
| 3,951,870 | 4/1976 | Economy et al. | 423/371 |
| 3,976,749 | 8/1976 | Wedemeyer | 423/440 |
| 4,247,529 | 1/1981 | Mori et al. | 423/371 |
| 4,333,915 | 6/1982 | Iwai et al. | 423/371 |
| 4,333,916 | 6/1982 | Iwai et al. | 423/371 |
| 4,342,594 | 8/1982 | Ettmayer et al. | 423/371 |
| 4,460,697 | 7/1984 | Hara et al. | 501/87 |
| 4,746,501 | 5/1988 | Maya | 423/371 |
| 4,758,539 | 7/1988 | Brown et al. | 501/96.2 |
| 4,812,301 | 3/1989 | Davidson et al. | 423/440 |
| 5,023,213 | 6/1991 | Maya | 501/96.2 |
| 5,147,831 | 9/1992 | Zeiringer | 501/96 |
| 5,380,688 | 1/1995 | Dunmead et al. | 501/87 |
| 5,417,952 | 5/1995 | Koc et al. | 423/380 |
| 5,476,530 | 12/1995 | Gries et al. | 75/238 |

FOREIGN PATENT DOCUMENTS

| | | | |
|---|---|---|---|
| 42660 | 12/1981 | European Pat. Off. | 423/371 |
| 0362605 A2 | 4/1990 | European Pat. Off. | C01B 31/30 |
| 2910596 | 9/1979 | Germany | 423/371 |
| 58-036914 | 3/1983 | Japan | 423/371 |
| 61-232208 | 10/1986 | Japan | 423/371 |
| 61-261204 | 11/1986 | Japan | 423/371 |
| 5-287303 | 11/1993 | Japan | 423/371 |

OTHER PUBLICATIONS

Yoshimura et al., Combust. Plasma Synth. High–Temp. Mater., "Rapid Preparation of Titanium and Other Transition–Metal Nitride–and Carbide Powders by a Carbo–Reduction Method Using Arc–Image Heating," pp. 406–413, 1990 [no month].

Derwent Publications, 86-173234/27, J6 1106–405–A, (Oct. 1984).

Derwent Publications, 86-173235/27, J6 1106–406–A, (Oct. 1984).

Derwent Publications, 88-274855/39, J6 3201–009–A, (Feb. 1987).

Primary Examiner—Anthony Green
Attorney, Agent, or Firm—Kevin J. Nilsen

[57] ABSTRACT

A submicrometer transition metal carbonitride is produced having the formula:

$$M_a M'_b M''_{(1-a-b)} (C_{1-x} N_x)_z$$

wherein M is Ti, Zr or Hf; M' is V, Nb or Ta; M" is Cr, Mo or W; a ranges from 0 to 1; b ranges from 0 to 1 with the proviso that (a +b) is less than or equal to 1; x ranges from about 0.02 to about 0.95 and z ranges from about 0.9 to about 2. The transition metal carbonitride is produced by mixing (a) a transition metal oxide source of a transition metal in the above formula and (b) a carbon source such as carbon black. This mixture is heated at a rate of between about 100K/sec to about 100,000,000K/sec in a nitrogen containing non-oxidizing gas such as nitrogen or nitrogen mixed with argon to an elevated temperature that makes carbothermal reduction of the transition metal oxide source thermodynamically favorable for a residence time sufficient to convert the transition metal oxide source into at least one product selected from the group consisting of (i) a transition metal carbonitride and (ii) a transition metal carbonitride precursor. The product may be exposed to a finishing step involving heating the product to a temperature less than the elevated temperature in a finishing atmosphere such as nitrogen, hydrogen, inert gas or combinations thereof to form submicrometer carbonitrides of higher purity or different stoichiometry.

29 Claims, No Drawings

METHOD FOR MAKING SUBMICROMETER TRANSITION METAL CARBONITRIDES

FIELD OF THE INVENTION

This invention relates to methods for making a transition metal carbonitride powder.

BACKGROUND OF THE INVENTION

Transition metal nitride or carbonitrides, such as TiN and titanium-tungsten carbonitride, possess properties including high strength, high hardness, good wear resistance, high melting or decomposition temperature and corrosion resistance. These properties make these materials useful in many applications, such as dies, cutting tools, wear resistant parts, metal reinforcements, electrical resistors and as abrasives for polishing.

Three generic methods are known for the production of transition metal nitrides or carbonitrides.

The first method is a direct carburization/nitridation of transition metal or hydride. This method requires long reaction times to complete and produces strongly agglomerated powders. To yield fine powders generally requires extensive milling. Consequently, impurities introduced during milling are typically removed from the powder chemically (e.g., acid wash).

The second method is a gaseous pyrolysis of a halide, such as $TiCl_4$, in an atmosphere containing nitrogen and, optionally, carbon. Generally, poor yields are obtained even at temperatures exceeding 1,300° C. Reactions conducted at lower temperatures typically result in nonstoichiometric products. Because of the cost and performance of this method, it has not been employed commercially.

The third method is carbothermal reduction of a transition metal oxide in the presence of carbon in a nitrogen containing atmosphere at a high temperature (1700°–2100° C.). The reaction time is typically long (1 to 20 hours) and powders produced generally have non-uniform and larger particle sizes. Consequently, to achieve more uniform and smaller particles, these powders also typically require milling and purification, previously described.

Recently, fine transition metal nitrides and carbonitrides have been produced addressing some of the problems in making transition metal nitrides and carbonitrides, described above. R. Koc et al. (U.S. Pat. No. 5,417,952) describe a carbothermal process for synthesizing titanium carbide, titanium nitride or titanium carbonitride. The process comprises cracking a thermally decomposable hydrocarbon gas in the presence of titanium salt or titanium oxide particles having a very fine starting particle size (i.e., at most about 0.2 micrometer in diameter) to form a uniform coating of carbon on the particles. Subsequently, the coated particles are reacted in a nitrogen containing or inert gas atmosphere to produce titanium nitride, carbide or carbonitride that has a fine size. The reaction is carried out for about 1 to 2 hours at a temperature of about 1200° C. to 1600° C.

Similarly, Gries et al. (U.S. Pat. No. 5,476,530) describe reacting a titanium oxide having a surface area of 12 m²/g (i.e., equivalent spherical diameter of 0.095 micrometer) with a carbon source in a flowing nitrogen/argon atmosphere. The carbon-oxide mixture is prepared under moist conditions so that highly intensive contacting and homogeneous distribution of the reactive components is achieved. Mixing in an aqueous solution results in the coating of the oxide particles by finer carbon particulates (45 m²/g) and solubilized organic carbonaceous material, such as sugar, upon drying. The mixture is then dried and formed into a viscous paste, followed by further drying and, subsequently, reacting the still moist mixture in a graphite furnace at 1500° C. to 1700° C. for 30 to 180 minutes. The carbonitride product is dry ball milled for 4 hours to produce a carbonitride powder having an average particle size of about 0.7 micrometer in diameter.

It would be desirable to provide a method to form a transition metal carbonitride having a fine particle size without (1) having to coat the oxide particles with a carbon containing material or (2) using an extremely fine transition metal oxide reactant powder.

SUMMARY OF THE INVENTION

The present invention provides an economical, rapid and efficient method for making submicrometer transition metal carbonitride powders for use in applications described previously.

The object of this invention is a method for making a particulate ceramic comprising:

mixing (a) a transition metal oxide source, the transition metal of the transition metal oxide source being selected from at least one of the group consisting of tungsten, titanium, tantalum, molybdenum, zirconium, hafnium, vanadium, niobium and chromium and (b) a carbon source to form a particulate mixture;

rapidly carbothermally reducing the transition metal oxide source by heating the particulate mixture at a rate of between about 100K/sec to about 100,000,000K/sec in a nitrogen containing non-oxidizing gas to an elevated temperature that makes carbothermal reduction of the particulate mixture thermodynamically favorable and holding the particulate mixture at the elevated temperature for a residence time sufficient to substantially convert the transition metal oxide source into at least one product selected from the group consisting of (i) a transition metal carbonitride and (ii) a transition metal carbonitride precursor.

In practicing the present invention, some transition metal carbonitrides may be produced by a two- step process. In step one, the metallic oxide undergoes a rapid carbothermal reduction to form the product or precursor described above. In step two, the product from step 1 is heated for a second time at a lower temperature (finishing step) in a non-oxidizing atmosphere to form the submicrometer transition metal carbonitride. The two-step process is not needed in all cases, but may be used when necessary or desired.

DETAILED DESCRIPTION OF THE INVENTION

The Transition Metal Carbonitride

The transition metal carbonitride is a single transition metal carbonitride or solid solution transition metal carbonitride. The transition metal carbonitride may be given by the formula:

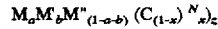

$$M_a M'_b M''_{(1-a-b)} (C_{(1-x)} N_x)_z$$

wherein M is Ti, Zr or Hf; M' is V, Nb or Ta; M" is Cr, Mo or W; a ranges from 0 to 1; b ranges from 0 to 1; with the proviso that (a+b) is less than or equal to 1; x ranges from about 0.02 to about .95 and z ranges from about 0.9 to about 2. Preferably M is Ti. Preferably M' is Ta. Preferably M" is W. Preferably x is at least 0.2, more preferably at least 0.4, and most preferably at least about 0.6. Preferably z is at most about 1.9, more preferably at most about 1.7.

The transition metal carbonitride has an average particle size of at most about 1.0 µm. The carbonitride particles are beneficially greater than 0 µm to less than or equal to about 1.0 µm in diameter, are typically less than or equal to about 0.5 µm in diameter, preferably from about 0.01 µm to less than or equal to about 0.3 µm in diameter and, optimally, between about 0.05 and about 0.2 µm in average diameter.

The transition metal carbonitride has a purity of at least about 90% by weight of the total powder weight, preferably the transition metal carbonitride has a purity of at least about 98% by weight (herein, "pure transition metal carbonitride"), and more preferably the transition metal carbonitride has a purity of at least about 99% by weight (herein, "highly pure transition metal carbonitride"). Materials formed having less than about 90% purity, but at least about 50% purity, by weight from the rapid carbothermal reduction process are referred to herein as a "transition metal carbonitride precursor." Impurities that may be present in the carbonitrides may include unreacted transition metal oxide, one or more of the above transition metals, free carbon and other compounds that do not contain the transition metals described above. Said other compounds generally are impurities that are present in the reactants (e.g., carbon source and transition metal oxide). Generally, these other compounds are present in an amount of at most about 3% by weight of the precursor or carbonitride.

Preparation of A Transition Metal Carbonitride Material

The transition metal carbonitrides of the present invention are prepared by the rapid carbothermal reduction of a transition metal oxide source. In preparing the carbonitride, a particulate mixture is made. The particulate mixture is a mixture of a carbon source and transition metal oxide source. The mixture may be made by any known mixing means such as V-blending, stirring, ultrasonic agitating and milling. The particulate mixture may be mixed dry or in a liquid. The particulate mixture is preferably prepared by dry mixing. Preferably the mixture is made by milling the carbon and oxide source together. Representative milling techniques include jet milling or milling with milling media (e.g., ball milling, attritor milling and planetary milling). When milling with media, the milling media is preferably a cemented tungsten carbide-cobalt milling media (i.e., balls). Preferably milling is done dry. When milling with media, ball milling is preferred.

The transition metal of the transition metal oxide source is at least one transition metal selected from the group consisting of tungsten, titanium, tantalum, molybdenum, zirconium, hafnium, vanadium, niobium and chromium. The metal oxide source is a metal oxide or compound that decomposes to a metal oxide, such as metatungstic acid or ammonium paratungstate. Preferably the metal oxide source is a mono-transition metal oxide, such as an oxide of tungsten, titanium, tantalum, molybdenum, zirconium, hafnium, vanadium, niobium or chromium. When making a transition metal solid solution carbonitride, a mixture of oxides or a single multimetallic alloy oxide containing two or more of the transition metals may be used. Preferably when making a solid solution carbonitride, a mixture of mono-transition metal oxides is used.

To avoid the possibility of creating a low temperature eutectic oxide which may inhibit the formation of a solid solution carbonitride, it may be beneficial to use a substantially non-oxide reactant transition metal compound. The formation of a low temperature eutectic oxide may inhibit the reaction by forming a large oxide aggregate that would react slowly. The transition metal compound is a compound that can form a solid solution transition metal carbonitride with the transition metal oxide of the particulate mixture, while substantially avoiding the formation of a low temperature oxide phase. Representative examples of the substantially non-oxide transition metal compound include carbides, nitrides, carbonitrides and metals of the transition metals previously described. The compound may also include the carbonitride precursors previously described. For example, when forming a solid solution tungsten-titanium carbonitride, it may be preferable to first react $TiO_2$ with carbon by rapid carbothermal reduction to form a carbide or carbonitride product and, subsequently, mix this product with $WO_3$ and carbon to form the particulate mixture, which is then reacted as described herein to form a transition metal solid solution carbonitride.

The metal oxide source preferably contains the simple oxides of the metals, such as $WO_3$, titanium dioxide ($TiO_2$) and tantalum pentoxide ($Ta_2O_5$). The oxide or oxides preferably have an average particle size of at most about 25 micrometers in diameter. More preferably the average particle size is at most about 20 micrometers, even more preferably at most about 15 micrometers, and most preferably at most about 10 micrometers to preferably at least about 0.25 micrometer, more preferably at least about 0.5 micrometer, even more preferably at least about 1.0 micrometer, and most preferably at least about 1.5 micrometer in diameter. The diameter is the equivalent spherical diameter. Preferably 99% or more by weight of the particles have a diameter of less than 44 micrometers (i.e., 99% of the particles pass through a 325 mesh).

The metal oxide may be amorphous or crystalline and the purity is preferably at least about 95% by weight. More preferably the purity is at least about 98% by weight, and most preferably the purity is at least about 99% by weight.

The carbon source may be particulate carbon, organic material or combination thereof. Preferably the carbon source is a particulate carbon, such as carbon black, graphite or organic materials that are solid powders at room temperature. The organic material, when decomposed, preferably forms carbon. A particularly preferred carbon source is acetylene carbon black, such as acetylene carbon black, available from Chevron Chemical under the trade designation SHAWINIGAN. Examples of organic material include phenol-formaldehyde resins, cured epoxies, melamine, cross-linked polystyrenes, cellulosic polymers and carbohydrates, (e.g., sugars and starches). When the carbon source is particulate carbon, the size of the particulates is preferaby less than the transition metal oxide particle size.

The particulate mixture should have at least an amount of carbon which can react substantially all of the oxygen in the transition metal oxide source to carbon monoxide, to desirably at most an amount of carbon which does not form a carbonitride, having excess free carbon, a carbide product or combination thereof. For example, the amount of carbon of the particulate mixture is preferably at least an amount necessary to reduce the oxide of the metal oxide to "CO" (e.g., $WO_3 + 3 C = W + CO$) to preferably an amount of carbon of at most about the theoretical amount which would be necessary to make the most stable transition metal carbide in an inert gaseous atmosphere (e.g., $WO_3 + 4 C = WC + CO$). A slight excess of carbon may be used to compensate for carbon loss due to, for example, contamination during milling. The amount of carbon is preferably less than the amount necessary to make the most stable transition metal carbide in an inert gaseous atmosphere (i.e., in the absence of a reactive species such as nitrogen or hydrogen). Herein, the most stable carbides of the transition metals are: monotungsten carbide (WC); monotitanium carbide (TiC); monotantalum carbide (TaC); monovanadium carbide (VC); monohafnium carbide (HfC); mononiobium carbide (NbC); monozirconium carbide (ZrC); dimolybdenum carbide ($Mo_2C$) and trichromium dicarbide ($Cr_3C_2$).

Once the particulate mixture is prepared, the particles of the particulate mixture are then rapidly and preferably individually heated rapid carbothermally in the presence of a nitrogen containing non-oxidizing gas to an elevated temperature that makes carbothermal reduction of the transition metal oxide of the particulate mixture thermodynamically favorable.

The elevated temperature must be high enough such that the carbothermal reduction reaction is thermodynamically favorable. The temperature must also be less than the melting point of any intended reaction product(s). The minimum elevated temperature of the rapid carbothermal process is a temperature corresponding to a temperature where the Gibbs free energy of the carbothermal reduction reaction of the transition metal oxide is negative for the most stable transition metal carbide described previously. For example, when forming a carbonitride containing tungsten, the reaction temperature is a temperature where monotungsten carbide is thermodynamically favored in the absence of a gaseous reactive species, such as hydrogen or nitrogen. A reaction temperature of at least 1673K is considered beneficial, while temperatures of 1823K to 2673K are preferred. When a heating rate of 10,000K to 100,000,000K per second is employed, a reaction temperature of 1873K to 2423K is satisfactory. Approximate thermodynamically calculated minimum reaction temperatures for forming carbonitrides of transition metals are as follows: tungsten carbonitride 950K; titanium carbonitride 1555K; tantalum carbonitride 1381K; vanadium carbonitride 932K; hafnium carbonitride 1934K; niobium carbonitride 1228K; zirconium carbonitride 1930K; molybdenum carbonitride 742K and chromium carbonitride 1383K.

The nitrogen containing non-oxidizing gas is a gas that essentially fails to oxidize the transition metal carbonitride or carbonitride precursor, at or above the thermodynamically favorable temperature described above, and said gas contains an amount of nitrogen sufficient to form the transition metal carbonitride or carbonitride precursor at the reaction conditions described herein. The nitrogen containing non-oxidizing gas may be nitrogen or nitrogen mixed with an inert gas, the inert gas being, for example, He, Ne, Ar, Kr, Xe, Rn or mixture thereof. The amount of nitrogen is preferably at least about 5%, more preferably at least about 10%, even more preferably at least about 50% by volume of the nitrogen containing non-oxidizing gas and most preferably the nitrogen containing non-oxidzing gas is nitrogen. The nitrogen containing non-oxidizing gas may also be mixed with hydrogen or a carbon containing reducing gas. The carbon containing reducing gas is a gas that can reduce the transition metal oxide or carburize a transition metal of the transition metal oxide at or above the thermodynamically favorable temperature previously described. Examples of the carbon containing reducing gas include methane, ethane and carbon monoxide.

The elevated temperature, residence time and heating rate should be chosen so that together they yield the transition metal carbonitride or carbonitride precursor.

The heating rate for taking the particulate mixture from room temperature up to the elevated temperature is preferably at least on the order of 100 to 10,000K per second and, optimally, on the order of 10,000 to 100,000,000K per second.

In part, the residence time of the particulate mixture at the elevated temperature during the rapid carbothermal reduction process depends upon the heating rate and elevated temperature. Regardless of the temperature and heating rate, the residence time must be long enough to reduce at least a major portion (i.e., greater than about 50% by weight) of the metallic oxide from the particulate mixture. The residence time is preferably in the range of about 0.1 second to 10 minutes, depending upon the heating method, heating rate, reaction temperature and the ultimate particle size desired. For a reaction temperature of 1823K or above, a residence time of from about 0.2 to 10 seconds with a heating rate of about 10,000K to 100,000,000K per second is preferred. At the higher heating rate, residence times substantially greater than 10 seconds may undesirably produce sintered aggregates rather than particulate product. Whatever combination of reaction temperature, residence time and heating rate is selected, however, it should be adequate to convert the particulate mixture into a product composed mainly of a carbonitride of at least one transition metal.

The three factors of elevated temperature, residence time and heating rate also control the size of the particles obtained. They do so by affecting both the nucleation rate for forming the metal carbonitride particles and the growth rate of these particles, once formed. For example, presuming that the particles are roughly spherical in shape and the conversion of starting material to product occurs at a relatively constant volume rate, the growth rate of the particles would be proportional to the cube root of the residence time. In order to minimize the particle size of the resulting metal carbonitride powder, the elevated temperature, heating rate and residence time must be selected to yield a particle nucleation rate which is higher than, and preferably significantly higher than, the particle growth rate.

Preferred Methods of Rapid Carbothermally Reducing The Oxide of the Particulate Mixture There are two preferred methods for rapidly heating the particulate mixture of the transition metal oxide source and carbon source. In one method, known herein as the "drop" method, the particulate mixture is dropped into an already heated crucible that heats the particulate mixture at a rate of between about 100K per second to about 10,000K per second. In a second method, known herein as the "entrainment method," the particulate mixture is entrained in a non-oxidizing atmosphere into a vertical reaction tube furnace maintained at the reaction temperature, as described in commonly owned U.S. Patent 5,110,565, incorporated herein by reference. The heating rate in the entrainment method is about 10,000K per second to about 100,000,000K per second. A. W. Weimer et al. describe the heating rate determination in "Kinetics of Carbothermal Reduction Synthesis of Beta Silicon Carbide," *AIChE Journal*, Vol. 39, No. 3 (Mar. 1993), at pages 493–503.

In the drop method, an induction furnace is brought to the desired reaction temperature and allowed to equilibrate for about 30 minutes under a flowing nitrogen containing non-oxidizing gas previously described. Aliquots of the particulate mixture are dropped into a graphite crucible in the hot zone of the furnace. The extent of the reaction is monitored by measuring the reactant by-product carbon monoxide (CO) level in the crucible as a function of time. When the CO level decreases back to about its pre-reaction value, the reaction is deemed over.

The aliquot is, following conversion to the carbonitride, cooled as rapidly as possible back to a temperature sufficient to minimize particle agglomeration and grain growth. The drop method may be used as a predictor for results in the entrainment method.

In the entrainment method, the mixture has an average residence time in the vertical reaction tube furnace of from about 0.2 second to 1 minute, preferably about 0.2 to 10 seconds. Because the heating rate is slower in the drop method, the typical residence times in the drop method are on the order of 0.5 to 10 minutes, preferably from 0.5 to 5 minutes and more preferably from 0.5 to 3 minutes, rather than seconds, as is the case in the entrainment method.

The entrainment method involves the use of a vertical graphite tube reaction furnace disclosed in U.S. Pat. No. 5,110,565, previously incorporated by reference. The particulate mixture is placed into a feed hopper, which allows a flowing gas, such as the nitrogen containing non-oxidizing gas or a non-oxidizing gas described in the next paragraph, to entrain the powdered mixture and deliver it to the furnace's reaction chamber as a dust cloud. The powder or particulate mixture is immediately heated in the reaction chamber at rates of between about 10,000K to 100,000,000K per second, while the average residence time of powder in the furnace is on the order of seconds. The flowing gas carries the powder out of the reaction chamber hot zone and into a water cooled stainless steel jacket, which rapidly cools the reacted powder below 283K. The entrainment method is more preferred than the drop method because the entrainment method has produced smaller size particulates and is a more practical mass production method.

The non-oxidizing gas is a gas that essentially fails to oxidize the transition metal carbonitride or carbonitride precursor at a temperature that is thermodynamically favorable to form the transition metal carbonitride or carbonitride precursor and said gas essentially contains no nitrogen. Representative examples include an inert gas (e.g., He, Ne, Ar, Kr, Xe, Rn) which may be mixed with hydrogen or a carbon containing reducing gas previously described.

The reactor disclosed in U.S. Pat. No. 5,110,565 comprises four principal components of concern: a cooled reactant transport member; a reactor chamber fed by the transport member; a heating means for heating the reactor chamber and a cooling chamber fed by the reactor chamber.

The transport member can be considered to be a conduit disposed within a preferably annular gas flow space which serves to transport the particulate mixture into the reaction chamber. The transport member is suitably maintained at a temperature below the melting temperature of the metal oxide source so as to prevent the particulate mixture from coalescing either within, or near the exit of, the transport member. Accordingly, the temperature of the transport member should be sufficient to allow substantially all of the particulate mixture to enter the reactor chamber as discrete particles.

The particulate mixture is suitably fed into the transport member by a powder feeding mechanism. The particular powder feeding mechanism is not critical as long as it provides a metered or controlled flow of the particulate mixture to the transport member. The feeding mechanism can be a single screw feeder, a twin screw feeder, a vibrator feeder, a rotary valve feeder or some other feeder of conventional construction.

The reactor design and reactor capacity will determine the maximum acceptable particulate feed rates. For example, merely by way of illustration, for a reactor having a reaction zone volume of 2.16 cubic feet ($ft^3$) (0.06 cubic meter ($m^3$)) an acceptable feed rate is from about 0.02 to about 0.5 kilogram per minute (kgm). Acceptable feed rates for reactors having different reaction zone volumes can readily be determined without undue experimentation.

The nitrogen containing non-oxidizing gas may be supplied in several ways; as a major amount directly through the transport member, as a minor amount indirectly into the reaction chamber via a gas flow space around the perimeter of the reactant transport member or injected into the reactor chamber, including the cooling zone or combination thereof. The gas supplied by any one of the above ways may be the non-oxidizing gas described previously as long as one of the gas flows is a nitrogen containing non-oxidizing gas.

The non-oxidizing or nitrogen containing non-oxidizing gas is fed into the transport member at a pressure and a flow rate sufficient to entrain the particulate mixture and carry the particulate mixture into the reaction chamber. Thus, the flow rate determines the residence time in the reactor chamber. By way of illustration, the gas flow in the transport member and via a gas flow around the perimeter of the transport member are preferably at least 85 and 28 standard liters per minute (slm), respectively, for a reactor having a reaction zone volume of 2.16 $ft^3$ (0.06 $m^3$). The flow rates that are used also depend upon the reactor temperature and reactant feed rate. The gas flowing into the reactor chamber from the gas flow space acts to minimize or substantially eliminate contact of the particulate mixture with those reactor chamber surfaces near the junction with the exit of the transport member. Such contact is undesirable because these surfaces tend to be at temperatures which promote coalescence of the mixture. This can, in turn, lead to plugging of the reactor and termination of operation.

The entrained flow of particulate mixture enters the reaction zone in a form approximating that of a well-dispersed dust cloud. The particles of the mixture are heated almost instantaneously by gas convective and conductive heat transfer, as well as by thermal radiation from the walls defining the heated reaction zone. For particles of a diameter less than 1000 μm, however, particle heating is believed to be dominated by gas/particle conduction/convection processes, rather than radiation. Internal particle conduction is extremely rapid compared to surface heating, so that the particles may be assumed to be isothermal with heating rates adequately described for the mass by the surface heating characteristics. It is on this basis that the preferred heating rate of about 10,000K or higher per second is calculated. The actual temperature within the reaction zone may be determined by optical pyrometry or other suitable means.

The gaseous flow that entrains the particulate mixture and flows it into the reaction zone also carries the mixed particulate precursor out of the reaction zone. Beneficially, the entrained dust cloud exits the reaction zone and almost immediately enters a cooling zone. The cooling zone quenches or rapidly cools the mixed precursor below its reaction temperature. Cooling rates within the cooling zone beneficially approximate the heating rates within the reaction zone. The walls of the cooling zone cool the entrainment gas and rapidly remove any amount of heat retained by the product of the rapid carbothermal reaction. In the absence of this rapid cooling, reaction with the particles could occur for an extended time, thereby resulting in formation of undesirable agglomerates or larger grains in the product. The actual cooling time experienced will vary depending upon factors such as the particle size, the physical configuration of the cooling zone and the exit gas flow rate.

The cooled particles are suitably collected and processed by conventional technology. When transition metal carbonitride precursor particles are made, they are beneficially greater than 0 μm to less than or equal to about 1.0 μm in diameter, are typically less than or equal to about 0.5 μm in diameter, preferably from about 0.01 μm to less than or equal to about 0.3 μm in diameter, and optimally, between about 0.05 and about 0.2 μm in diameter.

Although these two particular heating methods have been tested and proven for rapid carbothermally heating the particulate mixture, any rapid heating method may be used to produce suitable submicrometer transition metal carbonitrides and submicrometer solid solution transition metal carbonitrides, so long as the rapidity of the heating is maintained.

Possible Second Step Of Carburization and Nitridation to Form The Carbonitride It is difficult to directly produce some transition metal carbonitrides, such as those containing tungsten, using the rapid carbothermal reduction process. As a result, when making tungsten carbonitrides, it is preferred to use a second step of carburization and/or nitridation (i.e., finishing step). In comparison, titanium containing carbonitrides, in the absence of tungsten, may be made in a single rapid carbothermal reaction, but may also employ a finishing step, if desired, to make a desired transition metal carbonitride selected from the group consisting of a carbonitride, a pure carbonitride, highly pure carbonitride and a carbonitride having a different stoichiometry.

When practicing the two-step process (rapid carbothermal process followed by a finishing step), one can readily use the entrainment method in step one and the drop method in step two. A preferred alternative to the drop method for step two is to use a rotary furnace to provide sufficient heating and residence time to form the transition metal carbonitride, pure transition metal carbonitride or highly pure transition metal carbonitride.

Once the product from the rapid carbothermal process of the present invention is collected, a carbonitride, pure carbonitride or highly pure transition metal carbonitride of desired stoichiometery may be obtained by further reacting the product in a finishing step involving carbothermal reduction, hydrogen reduction, carburization, nitridation or combination thereof, at a temperature less than the elevated temperature of the first reaction (i.e., rapid carbothermal reduction). Although the product of the first reaction may be one in which conversion is substantially complete, there may be an occasion in which a pure or highly pure carbonitride or carbonitride of differing stoichiometery is desired.

In the finishing step, the product of the carbothermal reduction of the transition metal oxide source of the particulate mixture is heated to a finishing temperature below the rapid carbothermal reduction reaction temperature (i.e., elevated temperature) in a finishing atmosphere for a time sufficient to form the desired submicrometer carbonitride. The finishing atmosphere may be nitrogen, hydrogen, the carbon containing reducing gas previously described, the inert gas previously described or mixtures thereof. The atmosphere is selected based upon the product that is desired.

The finishing step is carried out at a finishing temperature lower than the temperature used to form the precursor by the rapid carbothermal process, but at a temperature sufficient to convert the precursor to the desired submicrometer carbonitride. Preferably the finishing temperature is at least about 1073K, more preferably at least about 1173K, even more preferably 1273K, and most preferably at least about 1373K to preferably at most about 1873K, more preferably at most about 1773K, even more preferably at most about 1673K, and most preferably at most about 1573K.

The finishing step is carried out for a time, at the finishing temperature, sufficient to convert the precursor to the desired transition metal carbonitride. The time is desirably as short a time to adequately form the carbonitride. Preferably the time is at least about 5 minutes, more preferably at least about 15 minutes, and most preferably at least about 30 minutes to preferably at most about 120 minutes, more preferably at most about 90 minutes, and most preferably at most about 60 minutes.

An additional amount of supplemental solid carbon may be added to the product of the first step to carbothermally reduce any remaining chemically bound oxygen or carburize any metal remaining in the product of the first step. The precursor and the supplemental carbon may be mixed by using conventional mixing apparatus. Illustrative apparatus include ribbon blenders, roller mills, vertical screw mixers, V-blenders and fluidized zone mixers, such as that sold under the trade designation FORBERG.

By way of illustration, when the product of the first step is a tungsten containing precursor, a tungsten-molybdenum containing precursor, a tungsten-titanium containing precursor or a tungsten-vanadium containing precursor, heating or finishing is accomplished at a finishing temperature of from about 1473K to about 1673 K. That temperature is desirably maintained for a time of from about 15 to about 180 minutes.

If an additional a mount of solid carbon is added , the amount added is typically determined empirically. The amount of solid carbon to be added depends upon the conditions of the finishing step, such as the precursor characteristics (e.g., oxygen and metal concentration), heating apparatus, the amount and type of non-oxidizing atmosphere used and finishing time.

The finishing step may be performed with movement, or in the absence of movement (i.e., static), of the precursor or product from the first step. For example, the product from the first step may be placed in graphite boats and heated in the non-oxidizing atmosphere previously described. Preferably the product from the first step is heated while moving the product or precursor.

Movement of the precursor, with or without supplemental carbon, may be carried out in a variety of ways, but most preferably is carried out by putting the precursor in a rotary graphite crucible which is rotated, consequently, tumbling the precursor. For example, a crucible having a diameter of about 20 centimeters, which is rotated at 1 to 10 revolutions per minute, is useful for treating individual 500 gram lots of the precursor and optional supplemental carbon. Other apparatus suitable for agitating the precursor during heating include rotary calciners, fluidized beds and vibrating fluidized beds.

The following examples are solely for illustrative purposes and are not to be construed as limiting the scope of the present invention.

EXAMPLES

In the following examples a major amount is at least about 20% by weight of the product of each example, a minor amount is between about 20% to about 5% by weight of the product of each example and a small amount is at most about 5% by weight of the product of each example.

Example 1

A particulate mixture was prepared by ball milling 14.78 kg of $WO_3$, 1.79 kg of $Ta_2 O_5$, 2.08 kg of $TiO_2$ and 3.95 kg of C for 1 hour in a 40 gallon ball mill that contained 400 pounds of 0.5 inch (12.7 mm) diameter WC-6% Co milling media. The tungsten tri-oxide ($WO_3$) has an average particle size of about 5.2 microns, a surface area of 5.0 m2/g and is available from TACOW Trade Consultants, Ltd., Hockessin, Delaware, under the trade name Scopino Yellow Oxide. The tantalum pentoxide ($Ta_2O_5$) has an average particle size of 19 micrometers, a surface area of 0.08 $m^2$/g and is available from TACOW Trade Consultants, Ltd., Hockessin, Delaware, under the trade name Zhuzhou-Grade-F $Ta_2O_5$. The titanium dioxide ($TiO_2$) has an average particle size of about 13 micrometers, a surface area of about 1.4 $m^2$/g and is available from Matteson-Ridolfi (Riverview, Michigan) under the trade name Kronos K3020. The carbon black (C) was Chevron Shawinigan Acetylene Black. The surface area of these powders was determined by nitrogen gas adsorption using a Quantacrome Autosorb 1 (Quantachrome, Syosset, NY). After ball milling, the powder mixture was passed through a coarse (8 mesh, 2.36 mm) screen to remove the milling media.

Twenty-two (22.0) kilograms of the reactant particulate mixture were loaded into the feed hopper of a vertical graphite tube reaction furnace of the type disclosed in U.S. Pat. Nos. 5,110,565 and 5,380,688. The furnace tube was 3.35 meters (m) long and had a 15.2 centimeter (cm) inside diameter. The feed hopper was connected to the cooled reactant transport member of the furnace by a twin screw loss-in-weight feeder. The reactant transport member had an inside diameter of 1.3 cm and was maintained at a temperature of approximately 283K by water flowing through a cooling jacket surrounding the reactant transport member. The feed hopper was purged with argon gas for 30 minutes after the particulate mixture was loaded into it, while the furnace tube was brought to a temperature of 2083K, as measured by optical pyrometers viewing the outside wall of the reaction chamber. Argon gas flowed into the reactant transport member at a rate of 3 standard cubic feet per minute "scfm" (85.05 standard liters per minute "slm").

The particulate mixture was then fed from the feed hopper into the cooled reactant transport member at a rate of about 10 kg per hour (22 lbs. per hour) by the twin screw feeder. The flowing argon gas entrained the particulate mixture and delivered it to the reaction chamber as a dust cloud. The particulate mixture was immediately heated in the reaction chamber at a rate of approximately 10,000K to 100,000,000K per second. The average residence time of the particulate mixture in the furnace was between about 3 to about 4 seconds.

After exiting the hot zone of the reaction chamber, the flowing argon and carbon monoxide (generated during the carbothermal reduction reaction) gas mixture carried the product (referred to as precursor) into a water cooled stainless steel jacket that rapidly cooled the precursor below 283K. Nitrogen gas was admitted to the cooling zone of the reactor at a rate of approximately scfm, creating an atmosphere of argon, carbon monoxide and nitrogen in which the precursor was cooled. After exiting the reactor, the precursor was collected in a plastic bag that was inserted in a stainless steel drum.

The precursor was subjected to a second step (i.e., finishing step). 500 Grams of the precursor were homogenized by ball milling in a 1.6 gallon ball mill for 2 hours with 9.0 kg of 12.7 mm diameter WC-6% Co milling media. After homogenization, the oxygen and carbon contents were 2.36 wt. percent and 6.71 wt. percent, respectively, as measured by LECO fusion and combustion apparatus (Leco Corporation, St. Joseph, MI). 12.4 Grams of C (Chevron Shawinigan Acetylene Black) were then added to the homogenized precursor and the mixture was ball milled for an additional 2 hours. The precursor/carbon mixture was then heat treated at 1773K for 30 minutes in a graphite furnace. This finishing treatment was done in a flowing (15 scfh) atmosphere of 95% Ar and 5% $H_2$.

After the finishing step, the oxygen, carbon and nitrogen contents of the final product were measured by LECO analysis. The oxygen concentration was 0.26 wt. percent, the carbon was 7.53 wt. percent and the nitrogen was 0.45 wt. percent. The final product was comprised of cubic (Ti, Ta, W) solid solution carbonitride and a minor amount of WC, determined by X-ray diffraction. The final product had an average crystallite size of 0.060±0.024 micrometer based upon the measurement of 112 randomly selected particles using a scanning electron microscope (SEM). The surface area of the final product was 2.95 $m^2$/g, determined by nitrogen gas adsorption using a Quantacrome Autosorb 1 (Quantachrome, Syosset, NY).

Example 2

Example 1 was repeated except that the composition of the particulate mixture was 5.72 kg of $WO_3$, 6.44 kg of $TiO_2$ (Degussa P25), 5.53 kg of $Ta_2O_5$, and 4.99 kg of C. 1055 Grams of the precursor were homogenized as described in Example 1. The $TiO_2$ of this example has an average particle size of about 0.7 micrometer and a surface area of about 2.8 $m^2$/g. The homogenized precursor oxygen and carbon contents were 4.88 wt. percent and 12.04 wt. percent, respectively. 14.11 Grams of C were added to the precursor and the mixture was ball milled for an additional 2 hours. The precursor/C mixture was then finished by the same procedure described in Example 1, except that the finishing temperature was 1873K and the time was 15 minutes.

After the finishing step, the oxygen, carbon and nitrogen contents of the final product were 0.33 wt. percent, 10.89 wt. percent and 0.95 wt. percent, respectively. As determined by powder X-ray diffraction, the final product was comprised of cubic (Ti, Ta, W) solid solution carbonitride and a minor amount of WC. The average crystallite size of the final product was 0.063±0.017 micrometer based upon the measurement of 102 randomly selected particles using scanning electron microscopy (SEM). The surface area of the product was 5.78 m2/g.

Example 3

Example 1 was repeated except that the particulate mixture consisted of 8.05 kg of $WO_3$, 9.07 kg of $TiO_2$ (Degussa P25 instead of Kronos K3020) and 5.55 kg of C. The particulate mixture was ball milled and reacted as previously described in Example 1 to form a precursor. 500 Grams of the precursor were homogenized. The oxygen and carbon contents of the homogenized precursor were measured 4.96 wt. percent and 13.33 wt. percent, respectively. No C was added to the precursor and the homogenized precursor was ball milled for an additional 2 hours. The precursor, without added carbon, was then finished using the same procedure, as described in Example 1, except that the finishing temperature was 1773K, the finishing time was 60 minutes and the finishing gas was nitrogen instead of 95% Ar/5% $H_2$. The finishing conditions are shown in Table 1.

After the finishing step, the oxygen, carbon and nitrogen contents of the final product were 0.62 wt. percent, 10.62 wt. percent and 7.86 wt. percent. The final product was comprised of a cubic (Ti, W) solid solution carbonitride phase and a small amount of WC. The characteristics of the product are shown in Table 2.

Example 4

500 Grams of the precursor of Example 3 were homogenized and the oxygen and carbon contents were 4.96 wt. percent and 13.33 wt. percent, respectively. 4.15 Grams of C were added to the precursor and the mixture was ball milled for an additional 2 hours. The precursor/C mixture was then finished by the same procedure described in Example 3. The conditions of the finishing step are shown in Table 1.

After the finishing step, the oxygen, carbon and nitrogen contents of the final product were 0.66 wt. percent, 11.41 wt. percent and 7.89 wt. percent. The final product was comprised of a cubic (Ti, W) solid solution carbonitride and a small amount of WC. The characteristics of the product are shown in Table 2.

Example 5

500 Grams of the precursor synthesized, as described in Example 3, were homogenized. The homogenized precursor oxygen and carbon contents were 4.96 wt. percent and 13.33 wt. percent, respectively. 8.80 Grams of C were added to the homogenized precursor and the mixture was ball milled for an additional 2 hours. The precursor/C mixture was then finished using the same procedure as described in Example 3. The conditions used during the finishing step are shown in Table 1.

After the finishing step, the oxygen, carbon and nitrogen contents of the final product were 0.72 wt. percent, 12.39 wt. percent and 7.69 wt. percent. The final product was comprised of a cubic (Ti, W) solid solution carbonitride and a small amount of WC. The characteristics of the product are shown in Table 2.

Example 6

500 Grams of the precursor synthesized, as described in Example 3, were homogenized. The homogenized precursor had an oxygen and carbon content of 4.96 wt. percent and 13.33 wt. percent, respectively. 13.45 Grams of C were added to the precursor and the mixture was ball milled for an additional 2 hours. The precursor/C mixture was then finished using the same procedure as in Example 10. The conditions of the finishing step are shown in Table 1.

After the finishing treatment, the oxygen, carbon and nitrogen contents of the final product were 0.81 wt. percent, 13.41 wt. percent and 7.55 wt. percent. The final product was comprised of cubic (Ti, W) solid solution carbonitride and a small amount of WC. The characteristics of the product are summarized below in Table 2.

Examples 7–26

Examples 7 to 26 used the precursor described in Example 3. These examples used the same procedure described in Examples 3 through 6, except that the finishing times, temperatures and atmospheres used were different, as shown in Table 1.

After the finishing treatment, the oxygen, carbon and nitrogen contents of the final product were measured by LECO. X-ray diffraction of the final product, in all cases, showed the presence of a cubic (Ti, W) solid solution carbonitride and a small amount of WC. The characteristics of all of the products are shown in Table 2.

TABLE 1

Finishing Conditions for Examples 3–26.

| Example No. | Carbon Addition (g) | Temperature (K) | Time (minutes) | Atmosphere |
|---|---|---|---|---|
| 3 | 0.00 | 1773 | 60 | N2 |
| 4 | 4.15 | 1773 | 60 | N2 |
| 5 | 8.80 | 1773 | 60 | N2 |
| 6 | 13.45 | 1773 | 60 | N2 |
| 7 | 0.00 | 1773 | 60 | 5% H2/Ar |
| 8 | 4.15 | 1773 | 60 | 5% H2/Ar |
| 9 | 8.80 | 1773 | 60 | 5% H2/Ar |
| 10 | 13.45 | 1773 | 60 | 5% H2/Ar |
| 11 | 0.00 | 1873 | 30 | 5% H2/Ar |
| 12 | 4.15 | 1873 | 30 | 5% H2/Ar |
| 13 | 8.80 | 1873 | 30 | 5% H2/Ar |
| 14 | 13.45 | 1873 | 30 | 5% H2/Ar |
| 15 | 0.00 | 1873 | 30 | vacuum |
| 16 | 4.15 | 1873 | 30 | vacuum |
| 17 | 8.80 | 1873 | 30 | vacuum |
| 18 | 13.45 | 1873 | 30 | vacuum |
| 19 | 0.00 | 1573 | 120 | N2 |
| 20 | 4.15 | 1573 | 120 | N2 |
| 21 | 8.80 | 1573 | 120 | N2 |
| 22 | 13.45 | 1573 | 120 | N2 |
| 23 | 0.00 | 1873 | 30 | N2 |
| 24 | 4.15 | 1873 | 30 | N2 |
| 25 | 8.80 | 1873 | 30 | N2 |
| 26 | 13.45 | 1873 | 30 | N2 |

TABLE 2

Product Characteristics for Examples 3–26.

| Example No. | Oxygen (wt. %) | Carbon (wt. %) | Nitrogen (wt. %) |
|---|---|---|---|
| 3 | 0.62 | 10.62 | 7.86 |
| 4 | 0.66 | 11.41 | 7.89 |
| 5 | 0.72 | 12.39 | 7.69 |
| 6 | 0.81 | 13.41 | 7.55 |
| 7 | 0.39 | 10.87 | 4.67 |
| 8 | 0.50 | 11.76 | 4.23 |
| 9 | 0.54 | 12.62 | 4.04 |
| 10 | 0.58 | 13.50 | 3.99 |
| 11 | 0.24 | 10.88 | 3.30 |
| 12 | 0.32 | 11.66 | 3.60 |
| 13 | 0.33 | 12.55 | 3.50 |
| 14 | 0.34 | 13.37 | 3.40 |
| 15 | 0.33 | 11.00 | 3.09 |
| 16 | 0.28 | 11.80 | 3.00 |
| 17 | 0.28 | 12.76 | 3.04 |
| 18 | 0.34 | 13.54 | 3.11 |
| 19 | 1.64 | 10.89 | 9.89 |
| 20 | 1.64 | 11.65 | 11.16 |
| 21 | 1.64 | 12.53 | 11.27 |
| 22 | 1.68 | 13.30 | 10.95 |
| 23 | 0.26 | 10.48 | 7.16 |
| 24 | 0.29 | 11.28 | 6.70 |
| 25 | 0.31 | 12.18 | 6.87 |
| 26 | 0.37 | 12.94 | 6.74 |

All of the tungsten titanium carbonitride materials described in Examples 3–26 contained some amount of free carbon. The presence of this free carbon was due to an excessive amount of carbon in the particulate precursor. The amount of carbon that would be necessary is readily determined by routine experimentation and depends on, for example, the carbonitride desired and the synthesis conditions employed, such as the amount of nitrogen, temperature, residence time and finishing conditions.

Also, Examples 3–26 show that a submicrometer carbonitride can be made in a two-step process even when the starting oxide reactant is not a submicron powder.

Example 27

Example 11 was repeated, except that 1250 g of the homogenized precursor of Example 10 was mixed with 27.9 g of C. The oxygen, carbon and nitrogen contents of the product were 0.37 wt. percent, 12.98 wt. percent and 3.75 wt. percent. The final product was comprised of a cubic (W-Ti) solid solution carbonitride and a small amount of residual WC, as determined by X-ray diffraction. The surface area of the final product was 11.7 m2/g. The crystallite size was 0.097±0.020 micrometer (range of 0.06 to 0.14 micrometer) based upon the measurement of 104 randomly selected particles.

TEM analysis of the final product showed that all of the nitrogen in the sample was in the form of a solid solution carbonitride (Ti-W)C-N. There was no TiN detected. The TEM analysis showed that the sample also contained a minor amount of (Ti-W)C and WC.

Example 28

Example 7 was repeated, except that 1252 g of the precursor of Example 10 was mixed with 26.2 g of C. The oxygen, carbon and nitrogen of the product were 0.65 wt. percent, 13.02 wt. percent and 5.06 wt. percent, respectively. The final product was comprised of a cubic (W-Ti) solid solution carbonitride and a small amount of residual WC, as determined by X-ray diffraction. The surface area of the final product was 14.9 m2/g. The crystallite size of 0.098±0.022 micrometer (range of 0.06 to 0.14 micrometer) based upon the measurement of 103 randomly selected particles by (SEM).

TEM analysis of the final product showed it to be very similar to the final product of Example 27. Again, the sample was found to contain a major amount of (Ti-W)C-N and a minor amount of (Ti-W)C and WC.

Examples 29–34

A 5.0 kg particulate mixture was prepared by milling 38.1 parts by weight (pbw) $WO_3$, 42.9 pbw $TiO_2$ (Kronos) and 19 pbw C (Chevron Shawinigan Acetylene Black), each described previously, in a 3 gallon urethane line ball mill for 2 hours with 7.5 kg of WC-Co milling media. After ball milling, the particulate mixture was passed through a coarse (8 mesh, 2.36 mm) screen to remove the milling media.

The particulate mixture was reacted using the drop method as follows. For each example 29–31, A 10 g aliquot of the particulate mixture was dropped into graphite crucible maintained at the reaction temperature (see Table 3) inside an inductively heated furnace. The mixture was reacted (under flowing nitrogen) for 5 minutes and then cooled back to room temperature as quickly as possible by shutting the furnace down. The characteristics of the product formed are summarized below in Table 3.

TABLE 3

| \multicolumn{5}{c}{Reaction Temperature and Product Characteristics for Examples 29–31.} |
|---|---|---|---|---|
| Example No. | Temperature (K.) | Carbon (wt. %) | Oxygen (wt. %) | Nitrogen (wt. %) |
| 29 | 1973 | 11.5 | 4.2 | 3.2 |
| 30 | 2073 | 9.4 | 1.5 | 4.0 |
| 31 | 2173 | 9.1 | 0.9 | 4.5 |

Each precursor (Examples 29–31) shown in Table 3 was finished using the method described in Example 1, except that each of the products of Examples 29–31 were further milled using a 1 quart ball mill and no carbon was added. The finishing heat treatment was conducted in a graphite furnace at 1873K for 15 minutes in flowing nitrogen. The characteristics of the final carbonitride products are shown below in Table 4.

TABLE 4

| \multicolumn{5}{c}{Product Characteristics of Example 32–34} |
|---|---|---|---|---|
| Example No. | Precursor Example No. | Carbon (wt. %) | Oxygen (wt. %) | Nitrogen (wt. %) |
| 32 | 29 | 9.30 | 0.62 | 4.04 |
| 33 | 30 | 8.91 | 0.56 | 4.87 |
| 34 | 31 | 8.88 | 0.51 | 4.90 |

The XRD of the products of Examples 32–34 showed them all to be composed of major amounts of (Ti, W) solid solution carbonitride and a small amount of WC. Examples 29–31 show that a carbonitride having a high nitrogen content may be formed by the rapid carbothermal reduction step. Examples 32–34 show that these carbonitrides may be further finished to reduce the oxygen content.

Examples 35–37

A 5.0 kg particulate mixture was prepared by ball milling 39 parts by weight (pbw) $WO_3$, 44 pbw $TiO_2$ (Kronos) and 17 pbw C (Chevron Acetylene Black)in a 3 gallon urethane line ball mill for 2 hours with 7.5 kg of WC-Co milling media. After ball milling, the powder mixture was passed through a coarse (8 mesh, 2.36 mm) screen to remove the milling media.

For each Example 35–37, the particulate mixture was reacted by the same method described for Examples 29–31. The synthesis conditions and the characteristics for each Example 35–37 is shown below in Table 5.

TABLE 5

| \multicolumn{5}{c}{Reaction Temperature and Product Characteristics of Examples 35–37} |
|---|---|---|---|---|
| Example No. | Temperature (K.) | Carbon (wt. %) | Oxygen (wt. %) | Nitrogen (wt. %) |
| 35 | 1973 | 7.5 | 4.5 | 9.0 |
| 36 | 2073 | 5.3 | 1.4 | 9.7 |
| 37 | 2173 | 4.9 | 1.0 | 10.4 |

Each of the precursors (Examples 35–37) shown in Table 5 was finished using a method similar to that described in Example 1 (save for the use of a 1 quart ball mill and no carbon addition). The finishing heat treatment was conducted in a graphite furnace at 1873° K. for 15 minutes in flowing nitrogen. The characteristics of the final carbonitride products are shown below in Table 6.

TABLE 6

Product Characteristics of Examples 38–40

| Example No. | Precursor Example No. | Carbon (wt. %) | Oxygen (wt. %) | Nitrogen (wt. %) |
|---|---|---|---|---|
| 38 | 35 | 5.25 | 0.48 | 9.01 |
| 39 | 36 | 4.80 | 0.52 | 9.50 |
| 40 | 37 | 4.91 | 0.45 | 9.41 |

The XRD of these final products showed them all to be composed of major amounts of (Ti,W) solid solution carbonitride and a small amount of WC. Examples 35–40 show similar results as Examples 29–34 and also that a lower carbon content in the particulate mixture results in a higher nitrogen in the final carbonitride product.

What is claimed is:

1. A method for making a particulate ceramic comprising:
   mixing (i) a transition metal oxide source, the transition metal of the transition metal oxide source being selected from at least one of the group consisting of tungsten, titanium, tantalum, molybdenum, zirconium, hafnium, vanadium, niobium and chromium and (ii) a carbon source to form a particulate mixture;
   carbothermally reducing the transition metal oxide source by heating the particulate mixture at a rate of between about 100K/sec to about 100,000,000K/sec in a nitrogen containing non-oxidizing gas to an elevated temperature that makes carbothermal reduction of the particulate mixture thermodynamically favorable and
   holding the particulate mixture at the elevated temperature for a residence time sufficient to convert the transition metal oxide source into at least one product selected from the group consisting of (i) a transition metal carbonitride and (ii) a transition metal carbonitride precursor wherein the residence time is from about 0.1 second to 5 minutes.

2. The method of claim 1, wherein the elevated temperature is from about 1673K to about 2673K and the product is the transition metal carbonitride precursor, said precursor containing tungsten.

3. The method of claim 2, wherein the transition metal carbonitride precursor particles are of a size from about 0.01 to 0.2 micrometer in diameter.

4. The method of claim 1, wherein the residence time is from about 0.1 second to 30 seconds.

5. The method of claim 1, wherein the residence time is from about 0.1 second to 10 seconds.

6. The method of claim 1, wherein the heating rate is from about 100 to about 100,000,000K/second.

7. The method of claim 1, wherein the heating rate is from about 1,000 to about 1,000,000K/second.

8. The method of claim 1, wherein said heating rate is from about 10,000 to about 100,000K/second.

9. The method of claim 1, wherein said product is at least one transition metal carbonitride selected from the group consisting of titanium carbonitride, zirconium carbonitride, hafnium carbonitride, tantalum carbonitride and molybdenum carbonitride.

10. The method of claim 1, wherein said product is a transition metal carbonitride selected from the group consisting of titanium carbonitride, molybdenum-tantalum carbonitride, titanium-tantalum carbonitride, hafnium- tantalum carbonitride, titanium-hafnium carbonitride, tantalum carbonitride and titanium-tantalum-hafnium carbonitride.

11. The method of claim 1, wherein said product is at least one transition metal carbonitride precursor selected from the group consisting of tungsten-molybdenum carbonitride precursor, tungsten-vanadium carbonitride precursor, tungsten-titanium-tantalum carbonitride precursor, tungsten-titanium carbonitride precursor, tungsten carbonitride precursor and tungsten-tantalum carbonitride precursor.

12. The method of claim 1, wherein the mixing s performed dry.

13. The method of claim 12, wherein the mixing is performed by dry ball milling.

14. The method of claim 13, wherein the dry ball milling is carried out using cemented WC-Co milling media.

15. The method of claim 1, wherein said carbon source is a particulate carbon.

16. The method of claim 15, wherein the carbon source is carbon black.

17. The method of claim 1, further comprising heating the transition metal carbonitride or transition metal carbonitride precursor in a finishing atmosphere to a finishing temperature lower than the elevated temperature for a finishing time sufficient to convert the precursor or carbonitride to a sure carbonitride, highly sure carbonitride or carbonitride of differing stoichiometry.

18. The method of claim 17, wherein the precursor is a tungsten containing precursor, the finishing temperature is about 1473K to about 1673K and the finishing time is from about 15 to about 60 minutes.

19. The method of claim 17, further comprising agitating the transition metal carbonitride or transition metal nitride precursor during heating.

20. The method of claim 17, wherein the finishing atmosphere is an inert gas, hydrogen, nitrogen or combination thereof.

21. The method of claim 20, wherein the inert gas is argon.

22. The method of claim 17, wherein the precursor carbonitride is mixed with a supplemental amount of carbon sufficient to carbothermally reduce any remaining chemically bound oxygen or carburize any metal remaining in the precursor prior to heating.

23. The method of claim 18, wherein the tungsten containing precursor forms a pure transition metal carbonitride selected from the group consisting of tungsten carbonitride, titanium-tungsten carbonitride, tantalum-tungsten carbonitride and titanium-tantalum- tungsten carbontride.

24. The method of claim 1, wherein the particulate mixture contains a substantially non-oxide reactant transition metal compound selected from the group consisting of a nitride, carbonitride, carbide, carbonitride precursor and combination thereof, wherein the transition metal of said transition metal compound is selected from the group consisting of Ti, Zr, Hf, V, Nb, Ta, Cr, Mo and W.

25. The method of claim 1, wherein the transition metal oxide source has an average particle size of at least about 0.25 micrometer to at most about 25 micrometers in diameter.

26. The method of claim 25, wherein the average particle size is at least about 0.5 micrometer.

27. The method of claim 26, wherein the average particle size is at least about 1 micrometer.

28. The method of claim 26, wherein the average particle size is at least about 1.5 micrometer.

29. A method for making a particulate ceramic comprising:
- mixing (i) a transition metal oxide source having an average particle size of about 1 micrometer to about 25 micrometers, the transition metal of the transition metal oxide source being selected from at least one of the group consisting of tungsten, titanium, tantalum, molybdenum, zirconium, hafnium, vanadium, niobium and chromium and (ii) a carbon source to form a particulate mixture;
- carbothermally reducing the transition metal oxide source by heating the particulate mixture at a rate of between about 100K/sec to about 100,000,000K/sec in a nitrogen containing non-oxidizing gas to an elevated temperature that makes carbothermal reduction of the particulate mixture thermodynamically favorable and
- holding the particulate mixture at the elevated temperature for a residence time sufficient to convert the transition metal oxide source into at least one product selected from the group consisting of (i) a transition metal carbonitride and (ii) a transition metal carbonitride precursor wherein the residence time is from about 0.1 second to 5 minutes and the transition metal carbonitride and the transition metal carbonitride precursor have an average particle size less than 1 micrometer.

* * * * *